United States Patent
Hanke et al.

(10) Patent No.: US 12,312,747 B2
(45) Date of Patent: May 27, 2025

(54) LOW STIFFNESS MULTI-PLY TISSUE PRODUCT

(71) Applicant: Kimberly-Clark Worldwide, Inc., Neenah, WI (US)

(72) Inventors: Jason D. Hanke, Appleton, WI (US); Michaela A. Busch, Neenah, WI (US); Jessica J. O'Connor, Appleton, WI (US); Mark W. Sachs, Appleton, WI (US); Kevin J. Vogt, Neenah, WI (US); Erin A. McCormick, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 255 days.

(21) Appl. No.: 17/918,609

(22) PCT Filed: Apr. 15, 2020

(86) PCT No.: PCT/US2020/028239
§ 371 (c)(1),
(2) Date: Oct. 13, 2022

(87) PCT Pub. No.: WO2021/211109
PCT Pub. Date: Oct. 21, 2021

(65) Prior Publication Data
US 2023/0147107 A1   May 11, 2023

(51) Int. Cl.
*D21H 27/00* (2006.01)
*D21H 19/20* (2006.01)
(Continued)

(52) U.S. Cl.
CPC ........... *D21H 27/005* (2013.01); *D21H 19/20* (2013.01); *D21H 21/14* (2013.01); *D21H 27/32* (2013.01)

(58) Field of Classification Search
CPC ...... D21H 27/005; D21H 19/20; D21H 21/14; D21H 27/32; D21H 27/002; D21H 27/40;
(Continued)

(56) References Cited

U.S. PATENT DOCUMENTS

| 9,410,290 B2 | 8/2016 | Hermans et al. |
| 2005/0045293 A1 | 3/2005 | Hermans et al. |

(Continued)

FOREIGN PATENT DOCUMENTS

| WO | 2019108188 A1 | 6/2019 |
| WO | 2020205520 A1 | 10/2020 |
| WO | 2020247205 A1 | 12/2020 |

OTHER PUBLICATIONS

Co-pending U.S. Appl. No. 17/914,834, filed Sep. 27, 2022, by Satori et al. for "Soft Wet Pressed Facial Tissue".
(Continued)

*Primary Examiner* — Dennis R Cordray
*Assistant Examiner* — Matthew M Eslami
(74) *Attorney, Agent, or Firm* — KIMBERLY-CLARK WORLDWIDE, INC.

(57) ABSTRACT

Disclosed are multi-ply tissue products, particularly creped and through-air dried tissue products, having cloth like properties, such as good drapability and durability. For example, the products generally comprise two plies and have a geometric mean slope (GM Slope) less than about 10.0 kg and a geometric mean tensile energy absorption (GM TEA) of about 15 g·cm/cm$^2$ or greater. In certain instances, the tissue products also have a low degree of stiffness, such as a Stiffness Index less than about 5.00. The tissue products may be prepared from webs manufactured by a print-crepe process that deposits a latex polymer on at least one of the outer surfaces of the tissue web.

15 Claims, 8 Drawing Sheets

(51) Int. Cl.
*D21H 21/14* (2006.01)
*D21H 27/32* (2006.01)

(58) Field of Classification Search
CPC .............. B32B 29/005; B32B 2250/26; B32B 2255/12; B32B 2255/26; B32B 2307/54; B32B 2555/02; B32B 29/00; B31F 2201/0756; B31F 2201/0761; B31F 2201/0787; B31F 1/126; B31F 1/14; D21F 11/14
See application file for complete search history.

(56) References Cited

U.S. PATENT DOCUMENTS

| | | |
|---|---|---|
| 2006/0130986 A1 | 6/2006 | Flugge-Berendes et al. |
| 2008/0073045 A1* | 3/2008 | Dyer .................... A47K 10/16 162/158 |
| 2009/0301675 A1 | 12/2009 | Edwards et al. |
| 2016/0319488 A1 | 11/2016 | Hermans et al. |
| 2019/0309482 A1* | 10/2019 | Zawadzki ............ D21H 27/002 |

OTHER PUBLICATIONS

Co-pending U.S. Appl. No. 17/914,838, filed Sep. 27, 2022, by Satori et al. for "Soft Through-Air Dried Facial Tissue".

* cited by examiner

LOW STIFFNESS MULTI-PLY TISSUE PRODUCT

BACKGROUND OF THE DISCLOSURE

Tissue products, such as facial tissues, paper towels, bath tissues, napkins, and other similar products, are designed to include several important properties. For example, the products should have good bulk, a soft feel, and should have sufficient strength and durability to withstand use. Further, to improve wiping utility, it may be desirable to provide the product with a degree of surface texture. Unfortunately, however, when steps are taken to increase one property of the product, other characteristics of the product are often adversely affected.

One means to balance important tissue product properties is to manufacture the products by processes that do not compress the nascent web during drying. Such processes often consist of non-compressive drying techniques in which the nascent web is molded to the contours of a patterned fabric that supports the web as it is dried. The wet molded web is typically dried by passing heated air through both the fabric and the wet web as it is transported over a cylindrical dryer. In this manner the web is imparted with a three-dimensional pattern and its bulk is maintained.

One widely used non-compressive drying process used to manufacture tissue products is through-air drying, which consists of transferring a wet-laid web to a coarse, highly permeable through-air drying fabric imparted with three-dimensional surface topography. The wet-laid web is molded to the through-air drying fabric and is supported by the fabric until it is at least almost completely dry. The resulting dried web is bulkier than compressively dewatered tissue webs, such as wet-pressed webs, because fewer papermaking bonds are formed and because the web is not pressed and densified.

Through-air drying also enables the papermaker to modify the machine direction (MD) properties of the tissue web by adjusting the speed of through-air drying fabric relative to other belts in the manufacture process. This speed differential, often referred to as rush-transfer, may be used to modify the MD stretch and modulus, such as disclosed in U.S. Pat. No. 8,956,503 to Hermans et al. Increasing MD stretch and decreasing MD modulus at a given tensile strength will generally increase durability and reduce the stiffness of the tissue product. Altering these properties may also improve the manufacturing efficiency, particularly the efficiency of converting operations, which benefit from increases in durability.

While the processes disclosed in Hermans, et al. have provided great advancements in the art of making tissue products with modified MD properties, there still remains a need for tissue products that are cloth like and have high degrees of drapability. Particularly, there is a need for tissue products having low modulus in both the machine and cross-machine directions.

SUMMARY OF THE DISCLOSURE

The present inventors have now successfully manufactured tissue products, particularly rolls of paper towel comprising a plurality of sheets separated from one another by perforations that may be broken to provide individual sheets, having a machine direction (MD) modulus, referred to herein as MD Slope, less than about 5.0 kg and a cross-machine direction (CD) modulus, referred to herein as CD Slope, less than about 10.0 kg. The low MD and CD moduli, provide tissue products having a low Stiffness Index, measured as the geometric mean slope divided by the geometric mean tensile strength, such as a Stiffness Index less than about 5.0. Surprisingly the decrease in stiffness does not come at the expense of durability. For example, the inventive tissue products may have a geometric mean tensile energy absorption, a measure of the amount of energy absorbed by the tissue at fracture, greater than about 15.0 g·cm/cm². The foregoing properties may even be achieved at relatively modest tensile strengths, such as a geometric mean tensile strength less than about 2,500 g/3". The resulting tissue products have cloth like attributes, such as high durability, good drapability and a soft handfeel.

Accordingly, in one embodiment the present invention provides a multi-ply tissue product, such as a tissue product comprising two or more through-air dried tissue plies, the product having a geometric mean tensile (GMT) from about 1,500 to about 2,500 g/3" and a geometric mean slope (GM Slope) less than about 10.0 kg, such as from about 4.0 to about 10.0 kg. In certain instances, the improved GM Slope may be achieved by reducing the cross-machine direction (CD) slope of the product to less than about 20.0 kg, such as from about 14.0 to about 20.0 kg.

In a particularly preferred embodiment the tissue products of the present invention have a high degree of bulk so as to provide good substance in hand, such as a bulk greater than about 10.0 cc/g, more preferably greater than about 12.0 cc/g and still more preferably greater than about 14.0 cc/g, such as from about 10.0 to about 16.0 cc/g, such as from about 12.0 to about 16.0 cc/g and more preferably from about 13.5 to about 15.5 cc/g.

In still other embodiments the present invention provides a multi-ply creped, through-air dried tissue product comprising a first creped, through-air dried tissue ply and a second creped, through-air dried tissue ply, the product having a basis weight greater than about 50 grams per square meter (gsm), a geometric mean tensile (GMT) from about 1,500 to about 2,500 g/3" and a GM Slope from about 4.0 to about 10.0 kg.

In yet another embodiment the present invention provides a multi-ply through-air dried tissue product having a geometric mean tensile (GMT) from about 1,500 to about 2,500 g/3", a Stiffness Index less than about 5.0 and a tensile energy absorption index (TEA Index) greater than about 1.00. The foregoing drapable and durable tissue product may have a bulk greater than about 10.0 cc/g, such as from about 10.0 to about 16.0 cc/g.

In another embodiment the present invention provides a multi-ply tissue product comprising a first creped tissue ply having a first outer surface and a creping composition disposed thereon, a second creped tissue ply having a first outer surface and a creping composition, also referred to herein as a binder composition, disposed thereon, the first and second creped tissue plies plied together in facing arrangement such that the first outer surfaces face one another, the product having a GMT from about 1,500 to about 2,500 g/3", a Stiffness Index from about 2.0 to about 4.0 and a TEA Index from about 1.20 to about 1.50. In certain instances, the creping composition disposed on the first outer surfaces of the first and second plies may comprise latex polymer, and more preferably a non-crosslinked latex polymer.

In still other embodiments, the present invention provides a method of making a tissue web comprising the steps of: (a) forming an aqueous suspension of fibers (b) depositing an aqueous suspension of fibers onto a forming fabric traveling at a first rate of speed to form a wet web; (c) dewatering the web to a consistency of about 20 percent or greater; (d) transferring the web to a through-air drying fabric and through-air drying the web to form a dried tissue web; (e) applying a latex polymer to the first outer surface of the dried tissue web in a pattern; (f) adhering the first outer surface of the dried tissue web to a rotary dryer, and (g) creping the tissue web from the rotary dryer. Preferably the resulting creped tissue ply has a basis weight from about 20 to about 30 grams per square meter (gsm).

In certain instances, plies produced according to the proceeding method may be plied together and embossed to form a multi-ply tissue product, particularly rolls of paper towel comprising a plurality of sheets. The rolled tissue product may be provided with a plurality of perforations that allow the product to be broken into individual sheets. When plying multiple plies together the individual plies may be brought into facing arrangement with one another such that the individual ply outer surfaces brought into contact with the Yankee dryer and having a creping composition disposed thereon may face one another such that the surfaces contacted by the user in-use is substantially free from the creping composition.

DEFINITIONS

Figure 1:
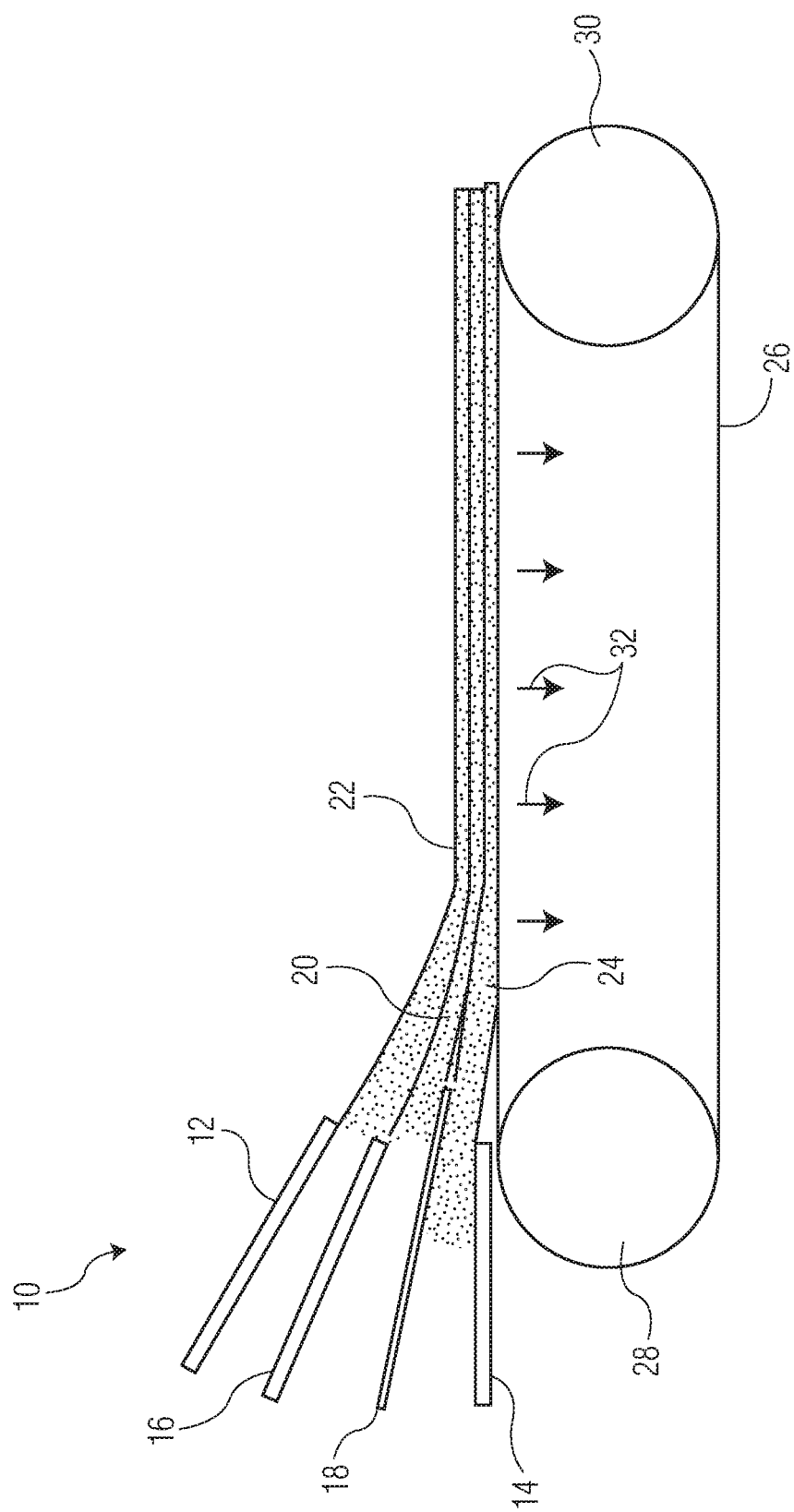
FIG. 1 illustrates one embodiment for forming a multi-layered tissue web according to the present invention.

As used herein the term "Basesheet" refers to a tissue web formed by any one of the papermaking processes described herein that may be subjected to further processing, such as embossing, calendering, treatment with a binder or softening composition, perforating, plying, folding, or rolling into individual rolled products.

As used herein the term "Tissue Product" refers to products made from basesheets and includes, bath tissues, facial tissues, paper towels, industrial wipers, foodservice wipers, napkins, medical pads, and other similar products.

As used herein the term "Ply" refers to a discrete tissue web used to form a tissue product. Individual plies may be arranged in juxtaposition to each other.

As used herein, the term "Layer" refers to a plurality of strata of fibers, chemical treatments, or the like, within a ply. The term "Layered Tissue Web" generally refers to a tissue web formed from two or more layers of aqueous papermaking furnish. In certain instances, the aqueous papermaking furnish forming two or more of the layers comprise different fiber types.

As used herein the term "Basis Weight" generally refers to the bone dry weight per unit area of a tissue and is generally expressed as grams per square meter (gsm). Basis weight is measured as described in the Test Methods section below. While the basis weights of tissue products prepared according to the present invention may vary, in certain embodiments the products may have a basis weight greater than about 45 gsm, such as greater than about 50 gsm, such as greater than about 55 gsm, such as from about 45 to about 65 gsm, such as from about 50 to about 60 gsm, such as from about 55 to about 60 gsm.

As used herein, the term "Caliper" refers to the thickness of a tissue product, web, sheet or ply, typically having units of microns (μm) and is measured as described in the Test Methods section below. Tissue products produced according to the present invention may be relatively thick and provide good substance in hand. While caliper may vary amongst tissue products prepared according to the present invention, in certain embodiments, tissue products may have a caliper greater than about 700 μm, such as greater than about 750 μm, such as greater than about 800 μm, such as from about 700 to about 900 μm.

As used herein, the term "Bulk" refers to the quotient of the product caliper (μm) divided by the product bone dry basis weight (gsm). The resulting bulk is expressed in cubic centimeters per gram (cc/g). Tissue products prepared according to the present invention may, in certain embodiments, have a bulk greater than about 10.0 cc/g, more preferably greater than about 12.0 cc/g and still more preferably greater than about 14.0 cc/g, such as from about 10.0 to about 15.0 cc/g.

As used herein, the term "Slope" refers to the slope of the line resulting from plotting tensile versus stretch and is an output of the MTS TestWorks™ in the course of determining the tensile strength as described in the Test Methods section herein. Slope typically has units of kilograms (kg) and is measured as the gradient of the least-squares line fitted to the load-corrected strain points falling between a specimen-generated force of 70 to 157 grams (0.687 to 1.540 N).

As used herein, the term "Geometric Mean Slope" (GM Slope) generally refers to the square root of the product of machine direction slope and cross-machine direction slope. While the GM Slope may vary amongst tissue products prepared according to the present invention, in certain embodiments, tissue products may have a GM Slope less than about 10.00 kg, such as less than about 8.00 kg, such as from about 4.00 to about 10.00 kg, such as from about 4.00 to about 8.00 kg, such as from about 4.00 to about 6.50 kg.

As used herein, the term "Geometric Mean Tensile" (GMT) refers to the square root of the product of the machine direction tensile strength and the cross-machine direction tensile strength of the web. The GMT of tissue products prepared according to the present invention may vary, however, in certain instances the GMT may be about 2,500 g/3" or less, such as about 2,250 g/3" or less, such as about 2,000 g/3" or less, such as from about 1,500 to about 2,500 g/3", such as from about 1,700 to about 2,000 g/3".

As used herein, the term "Stiffness Index" refers to the quotient of the geometric mean tensile slope, defined as the square root of the product of the MD and CD slopes (having units of kg), divided by the geometric mean tensile strength (having units of grams per three inches).

$$\text{Stiffness Index} = \frac{\sqrt{MD \text{ Tensile Slope (kg)} \times CD \text{ Tensile Slope (kg)}}}{GMT(g/3'')} \times 1{,}000$$

While the Stiffness Index of tissue products prepared according to the present invention may vary, in certain instances the Stiffness Index may be less than about 5.00, such as less than about 4.00, such as less than about 3.00, such as from about 2.00 to about 5.00, such as from about 2.00 to about 3.50.

As used herein, the term "TEA Index" refers the geometric mean tensile energy absorption (having units of g·cm/cm$^2$) at a given geometric mean tensile strength (having units of grams per three inches) as defined by the equation:

$$\text{TEA Index} = \frac{GM \ TEA(g \cdot \text{cm/cm}^2)}{GMT(g/3'')} \times 100$$

While the TEA Index may vary, in certain instances tissue products prepared according to the present invention have a TEA Index of about 1.00 or greater, such as about 1.20 or greater, such as about 1.40 or greater, such as from about 1.00 to about 1.50.

As used herein, the term "Wet/Dry Ratio" refers to the ratio of the wet cross-machine direction (CD) tensile strength to the dry CD tensile strength. Wet and dry CD tensile are measured as set forth in the Test Methods section below. The Wet/Dry Ratio of inventive tissue products may vary depending on several factors such as, for example, the creping composition and the amount of wet strength additive, however, in certain instances the inventive tissue products may have a Wet/Dry Ratio greater than about 0.40, such as greater than about 0.42, such as greater than about 0.44, such as from about 0.40 to about 0.50.

DETAILED DESCRIPTION OF THE DISCLOSURE

The present inventors have now surprisingly discovered tissue products having cloth like properties. The cloth like properties arise, in-part, to improved drapability and reduced stiffness. Surprisingly, the decrease in stiffness does not result in a decrease in durability. Accordingly, in a particularly preferred embodiment, the invention provides rolled paper towels comprising a creped multi-ply tissue web that is both drapable and durable, such as a product having a Stiffness Index less than about 5.0 and a geometric mean tensile energy absorption, a measure of the amount of energy absorbed by the tissue at fracture, greater than about 15.0 g·cm/cm$^2$.

Generally, the inventive tissue webs and products are manufactured by adhering the nascent tissue ply, also referred to herein as a web, to a rotating dryer, such as a Yankee dryer, and creping the web from the dryer to remove it. In particularly preferred embodiments a latex binder is used to adhere the nascent tissue web to the dryer surface and is transferred to the web surface once it is removed from the dryer by creping. Creping the nascent web to remove it from the rotating dryer disrupts fiber-fiber bonding and decreases the stiffness of the web. Of particular advantage, it has been discovered that the stiffness is decreased without substantially reducing durability. More particularly, it has been discovered that the process improves both the machine direction and cross-machine direction physical properties, such that the geometric mean modulus (measured as the geometric mean slope, GM Slope) is reduced while the amount of energy the product is able to absorb in both the machine and cross-machine directions before breaking is increased.

Without being bound by any particular theory it is believed that the presence of a latex creping composition on at least one outer surface of the tissue ply provides the ply with improved durability and strength, without negatively affecting stiffness. Accordingly, in certain preferred embodiments, the invention provides a multi-ply tissue product having a machine direction (MD) modulus, referred to herein as MD Slope, less than about 5.0 kg and a cross-machine direction (CD) modulus, referred to herein as CD Slope, less than about 10.0 kg. The low MD and CD moduli, provide a tissue product having a low Stiffness Index, measured as the geometric mean slope divided by the geometric mean tensile strength, such as a Stiffness Index less than about 5.0.

Surprisingly the decrease in stiffness does not come at the expense of durability. For example, the inventive tissue products may have a geometric mean tensile energy absorption, a measure of the amount of energy absorbed by the tissue at fracture, greater than about 15.0 g·cm/cm$^2$. The foregoing properties may even be achieved at relatively modest tensile strengths, such as a geometric mean tensile strength less than about 2,500 g/3".

In other embodiments the tissue products of the present invention have a GMT of about 2,500 g/3" or less, such as about 2,250 g/3" or less, such as about 2,000 g/3" or less, such as from about 1,500 to about 2,500 g/3", such as from about 1,700 to about 2,000 g/3". In other embodiments, the tissue products may have a geometric mean tensile energy absorption (GM TEA) of about 15 g·cm/cm$^2$ or greater, such as about 18 g·cm/cm$^2$ or greater, such as about 20 g·cm/cm$^2$ or greater, such as from about 15 to about 35 g·cm/cm$^2$, such as from about 18 to about 34 g·cm/cm$^2$, such as from about 20 to about 32 g·cm/cm$^2$. Accordingly, the tissue products may have a TEA Index of about 1.00 or greater, such as about 1.20 or greater, such as about 1.40 or greater, such as from about 1.00 to about 1.50.

While the inventive tissue products have good strength and durability, they are generally flexible. For example, the tissue products generally have a Stiffness Index less than about 5.00, such as less than about 4.00, such as less than about 3.00, such as from about 2.00 to about 5.00, such as from about 2.00 to about 4.00.

A comparison of the strength, stiffness and durability of various commercial and inventive tissue products is shown in Table 1, below. In one particularly preferred embodiment the present invention provides a multi-ply, such as a two-ply, tissue product, comprising a first and second creped, through-air dried tissue ply comprising a plurality of wood pulp fibers and a latex creping composition disposed on at least one outer surface of each ply, wherein the tissue product has a GMT from about 1,500 to about 2,500 g/3", a Stiffness Index less than about 5.0, such as from about 2.00 to about 5.00, and a TEA Index greater than about 1.00, such as from about 1.00 to about 1.50.

TABLE 1

|  | Creped | GMT (g/3") | GM Stretch (%) | GM TEA (g · cm/cm²) | GM Slope (kg) | Stiffness Index | TEA Index | CD Tensile (gf) | CD Slope (kgf) |
| --- | --- | --- | --- | --- | --- | --- | --- | --- | --- |
| Kirkland Signature | Y | 2794 | 12.69 | 29.37 | 20.35 | 7.28 | 1.05 | 2719 | 29.1 |
| Brawny | Y | 3410 | 12.84 | 34.82 | 19.86 | 5.82 | 1.02 | 3458 | 25.4 |
| Bounty | Y | 4282 | 12.43 | 43.07 | 20.71 | 4.84 | 1.01 | 3502 | 25.7 |
| Bounty Essentials | Y | 2682 | 8.87 | 18.06 | 12.73 | 4.75 | 0.67 | 2241 | 11.7 |
| Sparkle | Y | 2879 | 11.34 | 24.82 | 16.34 | 5.68 | 0.86 | 2132 | 33.6 |
| Great Value Ultra Strong | Y | 4067 | 9.77 | 41.25 | 28.87 | 7.10 | 1.01 | 3831 | 40.1 |
| Great Value Everyday Strong | Y | 2279 | 5.85 | 12.87 | 28.52 | 12.51 | 0.56 | 1539 | 29.0 |
| Presto | Y | 3264 | 11.20 | 26.61 | 16.85 | 5.16 | 0.82 | 3216 | 20.7 |
| Viva Multi Surface Cloth | N | 2922 | 13.53 | 27.50 | 11.74 | 4.02 | 0.94 | 2662 | 9.0 |
| Inventive 1 | Y | 1989 | 22.4 | 27.0 | 5.77 | 2.90 | 1.35 | 1601 | 18.3 |
| Inventive 2 | Y | 2317 | 23.4 | 32.2 | 6.70 | 2.89 | 1.39 | 1911 | 22.2 |
| Inventive 3 | Y | 1827 | 22.9 | 25.4 | 5.22 | 2.86 | 1.39 | 1471 | 18.0 |
| Inventive 4 | Y | 2265 | 23.2 | 32.0 | 6.37 | 2.81 | 1.41 | 1836 | 22.3 |
| Inventive 5 | Y | 1518 | 22.4 | 20.5 | 4.57 | 3.01 | 1.35 | 1222 | 14.1 |
| Inventive 6 | Y | 1897 | 22.2 | 25.2 | 5.59 | 2.95 | 1.33 | 1513 | 16.8 |
| Inventive 7 | Y | 1697 | 22.5 | 23.0 | 5.05 | 2.98 | 1.36 | 1384 | 15.8 |
| Inventive 8 | Y | 2024 | 22.9 | 28.2 | 5.97 | 2.95 | 1.40 | 1666 | 19.1 |

Generally the tissue products of the present invention have a basis weight, measured as the bone dry basis weight, of greater than about 45 gsm, such as greater than about 50 gsm, such as greater than about 55 gsm, such as from about 45 to about 65 gsm, such as from about 50 to about 60 gsm, such as from about 55 to about 60 gsm. At the foregoing basis weights the tissue products may have a bulk greater than about 10.0 cc/g, more preferably greater than about 12.0 cc/g and still more preferably greater than about 14.0 cc/g, such as from about 10.0 to about 16.0 cc/g, such as from about 12.0 to about 16.0 cc/g and more preferably from about 13.5 to about 15.5 cc/g. In a particularly preferred embodiment, the present invention provides a through-air dried tissue product comprising a plurality of wood pulp fibers and having a basis weight from about 54 to about 60 gsm and a bulk from about 12.0 to about 16.0 cc/g and more preferably from about 13.5 to about 15.5 cc/g.

In still other embodiments, the present disclosure provides tissue products having a high degree of stretch. For example, the products may have a geometric mean stretch (GM Stretch) of about 15.0 percent or greater, such as about 18.0 percent or greater, such as about 20.0 percent or greater, such as from about 18.0 to about 25.0 percent, such as from about 20.0 to about 25.0 percent.

In particularly preferred embodiments the inventive tissue products have improved cross-machine direction properties, such as improved CD Stretch, CD TEA and CD Slope. For example, the products may have a CD Slope from about 10.0 to about 25.0 kg, such as from about 14.0 to about 18.0 kg. In other embodiments the products may have a CD Stretch from about 12.0 to about 18.0. In still other embodiments the products may have a CD TEA from about 15.0 to about 25.0, such as from about 18.0 to about 22.0. In certain preferred embodiments the invention provides a two-ply tissue product comprising a first and second creped tissue ply, the product having a CD tensile strength of about 2,000 g/3" or less, such as from about 1,200 to about 2,000 g/3" and a CD Slope of about 25.0 kg or less, such as from about 10.0 to about 25.0 kg, such as from about 14.0 to about 18.0 kg.

In yet other embodiments, the inventive tissue products may be flexible, such as having a geometric mean slope (GM Slope) less than about 10.00 kg, such as less than about 8.00 kg, such as from about 4.00 to about 10.00 kg, such as from about 4.00 to about 8.00 kg, such as from about 4.00 to about 6.50 kg. The foregoing modulus may be achieved at modest tensile strengths, such as a GMT of about 2,500 g/3" or less, such as about 2,250 g/3" or less, such as about 2,000 g/3" or less, such as from about 1,500 to about 2,500 g/3", such as from about 1,700 to about 2,000 g/3". As a result, the inventive tissue products generally have a low degree of stiffness, measured as Stiffness Index, such as a Stiffness Index less than about 5.00, such as less than about 4.00, such as less than about 3.00, such as from about 2.00 to about 5.00, such as from about 2.00 to about 3.50.

The tissue products of the present invention are preferably wet-laid and comprise a plurality of fibers, such as cellulosic pulp fibers. In one example, the tissue products comprise a plurality of wood pulp fibers. In another example, the fibrous structure may comprise a plurality of non-wood pulp fibers, for example plant fibers, synthetic staple fibers, and mixtures thereof. Suitable cellulosic fibers for use in connection with this invention include secondary (recycled) papermaking fibers and virgin papermaking fibers in all proportions. Such fibers include, without limitation, hardwood and softwood kraft pulp fibers.

Non-limiting examples of processes for making fibrous structures include known wet-laid papermaking processes, for example through-air-dried papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire, fabric, or belt such that an embryonic fibrous structure is formed, after which drying and/or bonding the fibers together results in a tissue web. Further processing of the tissue web may be carried out such that a finished tissue product is formed.

In certain embodiments tissue products may be formed from one or more basesheets, which may comprise a single homogenous or blended layer, or be multi-layered. In those instances where the basesheet is multi-layered it may comprise, two, three, or more layers. For example, the basesheet may comprise three layers such as first and second outer layers and a middle layer disposed there between. The layers may comprise the same or different fiber types. For example, the first and second outer layers may comprise short, low coarseness wood pulp fibers, such as hardwood kraft pulp fibers, and the middle layer may comprise long, low coarseness wood pulp fibers, such as northern softwood kraft pulp fibers.

In those instances where the web comprises multiple layers, the relative weight percentage of each layer may vary. For example, the web may comprise first and second outer layers and a middle layer where the first outer layer comprises from about 25 to about 35 weight percent of the layered web, the middle layer comprises from about 30 to about 50 weight percent of the layered web and the second outer layer comprises from about 25 to about 35 weight percent of the layered web.

Multi-layered basesheets useful in the present invention may be formed using any number of different processes known in the art, such as the process disclosed in U.S. Pat. No. 5,129,988, the contents of which are incorporated herein in a manner consistent with the present disclosure. One process for a forming multi-layered basesheet is illustrated in FIG. 1. A dilute aqueous suspension of papermaking fibers is dispersed from a headbox 10 having an upper headbox wall 12 and a lower headbox wall 14 and first and second dividers 16, 18. In this manner the headbox may be used to form a basesheet having outer layers 22, 24 and a middle layer 20, where each of the layers may comprise the same or different papermaking fibers.

To form the multi-layered basesheet, an endless traveling forming fabric 26, suitably supported and driven by rolls 28 and 30, receives the layered papermaking stock issuing from headbox 10. Once retained on fabric 26, the layered fiber suspension passes water through the fabric as shown by the arrows 32. Water removal is achieved by combinations of gravity, centrifugal force and vacuum suction depending on the forming configuration.

In certain embodiments the one or more layers of a multi-layered basesheet, such as the middle layer, may be formed without a substantial amount of inner fiber-to-fiber bond strength. In this regard, the fiber furnish used to form a given layer can be treated with a chemical debonding agent. The debonding agent can be added to the fiber slurry during the pulping process or can be added directly the fiber slurry prior to the headbox. Suitable debonding agents that may be used in the present invention include cationic debonding agents, particularly quaternary ammonium compounds, mixtures of quaternary ammonium compounds with polyhydroxy compounds, and modified polysiloxanes.

Suitable cationic debonding agents include, for example, fatty dialkyl quaternary amine salts, mono fatty alkyl tertiary amine salts, primary amine salts, imidazoline quaternary salts and unsaturated fatty alkyl amine salts. Other suitable debonding agents are disclosed in U.S. Pat. No. 5,529,665, the contents of which are incorporated herein in a manner consistent with the present disclosure. In one embodiment, the debonding agent used in the process of the present invention is an organic quaternary ammonium chloride, such as those available under the tradename ProSoft™ (Solenis, Wilmington, DE). The debonding agent can be added to the fiber slurry in an amount of from about 1.0 kg per metric tonne to about 15 kg per metric tonne of fibers present within the slurry.

Particularly useful quaternary ammonium debonders include imidazoline quaternary ammonium debonders, such as oleyl-imidazoline quaternaries, dialkyl dimethyl quaternary debonders, ester quaternary debonders, diamidoamine quaternary debonders, and the like. The imidazoline-based debonding agent can be added in an amount of between 1.0 to about 10 kg per metric tonne.

In other embodiments, a layer or other portion of the basesheet, including the entire basesheet, may optionally include wet or dry strength agents. As used herein, "wet strength agents" are materials used to immobilize the bonds between fibers in the wet state. Any material that when added to the tissue web at an effective level results in providing the basesheet with a wet geometric tensile strength:dry geometric tensile strength ratio in excess of 0.1 will, for purposes of this invention, be termed a wet strength agent.

Particularly preferred wet strength agents are permanent wet strength agents. Particularly preferred wet strength agents are water-soluble, cationic materials, particularly those that undergo a cross-linking or other curing reaction after they have been deposited on, within, or among the papermaking fibers. Of particular utility are the various polyamide-epichlorohydrin resins. These materials are low molecular weight polymers provided with reactive functional groups such as amino, epoxy, and azetidinium groups. Polyamide-epichlorohydrin resins sold under the tradename Kymene by Solenis, Inc. of Wilmington, DE, are particularly useful in this invention.

In other instances, the basesheet may optionally include a dry strength additive, such as carboxymethyl cellulose resins, starch based resins, and mixtures thereof. Particularly preferred dry strength additives are cationic starches, and mixtures of cationic and anionic starches. In certain instances, the dry strength agent may comprise a commercially available modified starch such as marketed under the tradename RediBOND™ (Ingredion, Westchester, IL) or a commercially available carboxymethyl cellulose resin such as those marketed under the tradename Aqualon™ (Ashland LLC, Bridgewater, NJ).

The amount of wet strength agent or dry strength added to the pulp fibers can be at least about 0.1 dry weight percent, more specifically about 0.2 dry weight percent or greater, and still more specifically from about 0.1 to about 3 dry weight percent, based on the dry weight of the fibers.

Figure 2:
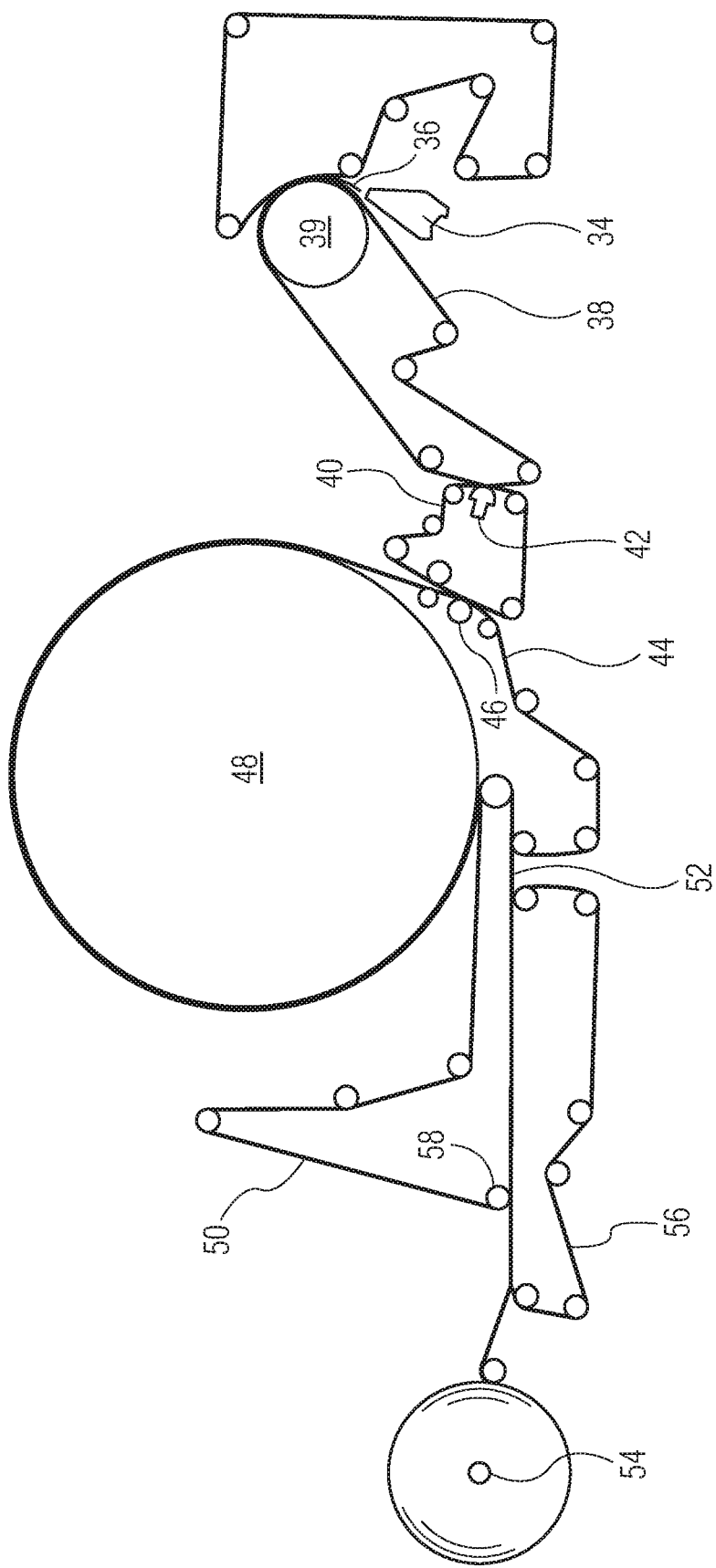
FIG. 2 illustrates one embodiment for forming a basesheet useful in the production of a tissue product according to the present invention.

Tissue basesheets useful in forming tissue products of the present invention are preferably formed by a through-air drying (TAD) manufacturing process. In particularly preferred embodiments the tissue product is manufactured by a creped through-air dried (CTAD) process or uncreped through-air dried (UCTAD) process. With reference now to FIG. 2, a method for making through-air dried paper sheets is illustrated. Shown is a twin wire former having a papermaking headbox 34, such as a layered headbox, which injects or deposits a stream 36 of an aqueous suspension of papermaking fibers onto the forming fabric 38 positioned on a forming roll 39. The forming fabric serves to support and carry the newly-formed wet web downstream in the process as the web is partially dewatered to a consistency of about 10 dry weight percent. Additional dewatering of the wet web can be carried out, such as by vacuum suction, while the wet web is supported by the forming fabric.

The wet web is then transferred from the forming fabric to a transfer fabric 40. In one embodiment, the transfer fabric can be traveling at a slower speed than the forming fabric in order to impart increased stretch into the web. This is commonly referred to as a "rush" transfer. The relative speed difference between the two fabrics can be from 0 to 60 percent, more specifically from about 15 to 45 percent. Transfer is preferably carried out with the assistance of a vacuum shoe 42 such that the forming fabric and the transfer fabric simultaneously converge and diverge at the leading edge of the vacuum slot.

The web is then transferred from the transfer fabric to the through-air drying fabric 44 with the aid of a vacuum transfer roll 46 or a vacuum transfer shoe, optionally again using a fixed gap transfer as previously described. The through-air drying fabric can be traveling at about the same speed or a different speed relative to the transfer fabric. If desired, the through-air drying fabric can be run at a slower speed to further enhance stretch. Transfer can be carried out with vacuum assistance to ensure deformation of the sheet to conform to the through-air drying fabric, thus yielding desired bulk and imparting the web with a three-dimensional topographical pattern. Suitable through-air drying fabrics are described, for example, in U.S. Pat. Nos. 6,998,024, 7,611,607 and 10,161,084, the contents of which are incorporated herein by reference in a manner consistent with the present disclosure.

In one embodiment, the through-air drying fabric comprises a single layer fabric woven from shute and warp filaments. In certain instances, the shute filaments may comprise two or more different diameters and may be interwoven with the warp filaments so as to form a textured sheet contacting surface having substantially continuous machine-direction ripples separated by valleys. In other instances, the woven fabric may comprise a plurality of substantially continuous machine-direction ripples formed of multiple warp strands grouped together and supported by multiple shute strands of two or more diameters. During drying, the web can be macroscopically arranged to conform to the surface of the through-air drying fabric and form a textured, three-dimensional surface.

The side of the web contacting the through-air drying fabric is typically referred to as the "fabric side" of the paper web. The fabric side of the paper web, as described above, may have a shape that conforms to the surface of the through-air drying fabric after the fabric is dried in the through-air dryer.

The opposite side of the paper web, on the other hand, is typically referred to as the "air side." The level of vacuum used for the web transfers can be from about 3 to about 15 inches of mercury (75 to about 380 millimeters of mercury), preferably about 5 inches (125 millimeters) of mercury. The vacuum shoe (negative pressure) can be supplemented or replaced by the use of positive pressure from the opposite side of the web to blow the web onto the next fabric in addition to or as a replacement for sucking it onto the next fabric with vacuum. Also, a vacuum roll or rolls can be used to replace the vacuum shoe(s).

While supported by the through-air drying fabric, the web is dried to a consistency of about 94 percent or greater by the through-air dryer 48 and thereafter transferred to a carrier fabric 50. The dried basesheet 52 is transported to the reel 54 using carrier fabric 50 and an optional carrier fabric 56. An optional pressurized turning roll 58 can be used to facilitate transfer of the web from carrier fabric 50 to fabric 56.

In one embodiment, the reel 54 shown in FIG. 2 can run at a speed slower than the fabric 56 in a rush transfer process for building bulk into the paper web 52. For instance, the relative speed difference between the reel and the fabric can be from about 5 to about 25 percent and, particularly from about 12 to about 14 percent. Rush transfer at the reel can occur either alone or in conjunction with a rush transfer process upstream, such as between the forming fabric and the transfer fabric.

Once the web is formed, a binder composition, also referred to herein as a creping composition, is applied to at least one side of the web. In this manner, the present invention provides a tissue product comprising a web having first and second outer surfaces, wherein at least one outer surface comprises a topically-applied binder, particularly a binder applied in a network. As used herein, the term "network" is used to describe any binder pattern that serves to bond the sheet together. The pattern can be regular or irregular and can be continuous or discontinuous.

Figure 3:
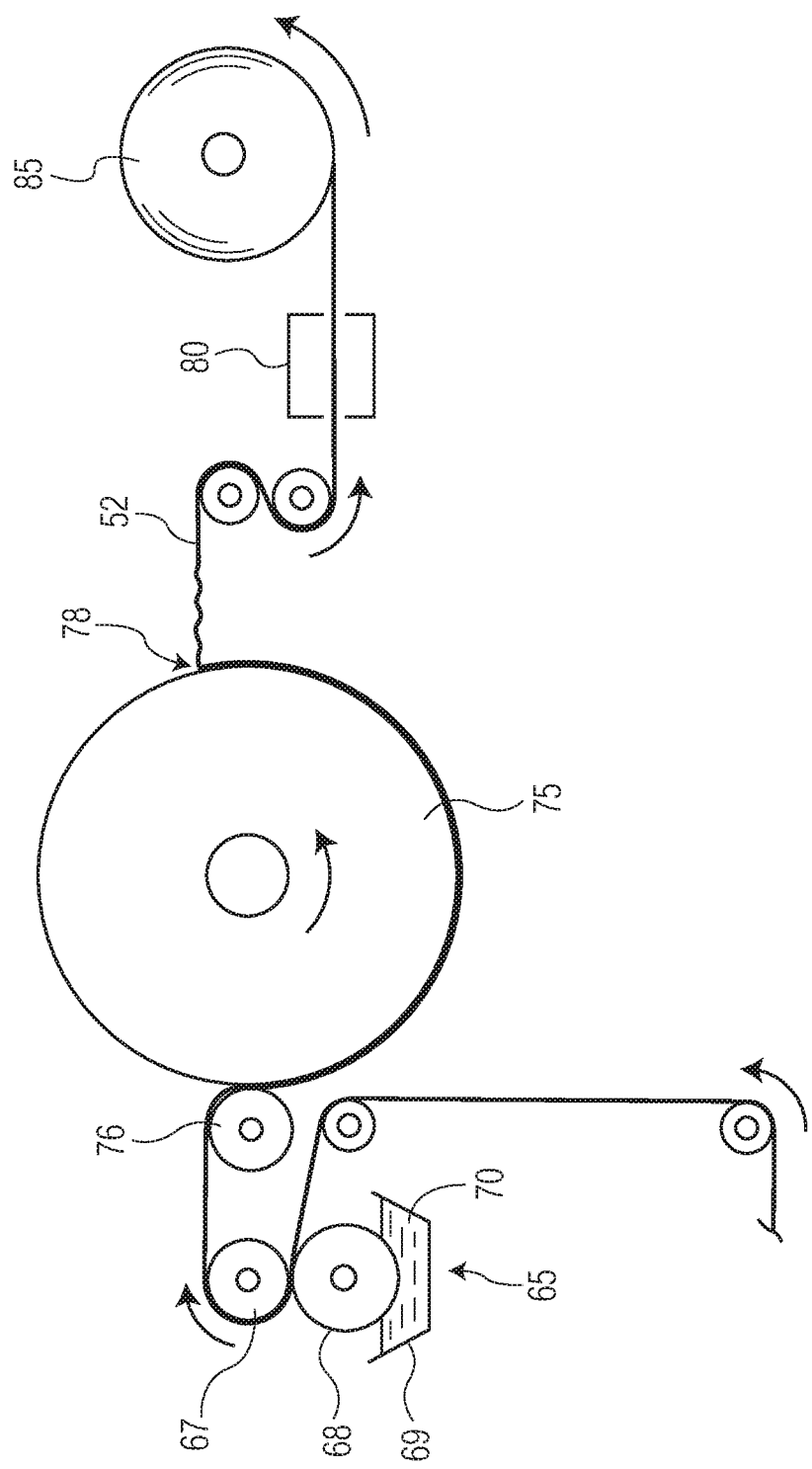
FIG. 3 illustrates one embodiment of a print-crepe process for producing a tissue product according to the present invention.

With reference now to FIG. 3, one embodiment of applying a binder material to one outer surface of a web is illustrated. Shown is paper web 52 passing through a binder material application station 65. Station 65 includes a transfer roll 67 in contact with a rotogravure roll 68, which is in communication with a reservoir 69 containing a suitable binder 70. Although gravure printing of the binder is illustrated, other means of applying the binder material can also be used, such as foam application, spray application, flexographic printing, or digital printing methods, such as ink jet printing, and the like. The rotogravure roll 68 applies binder material 70 to one side of the web 52 in a pre-selected pattern.

Figure 4:
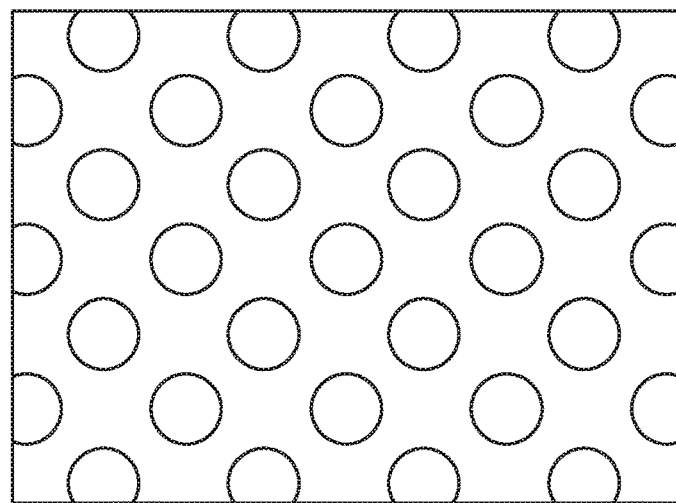
FIG. 4 illustrates one pattern for applying a binder to a basesheet.
Figure 5:
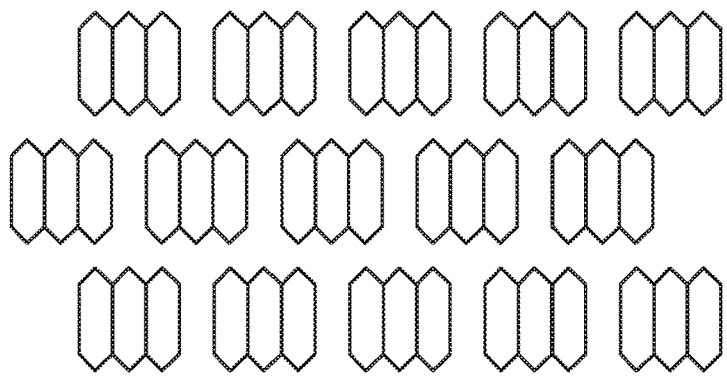
FIG. 5 illustrates another pattern for applying a binder to a basesheet.
Figure 6:
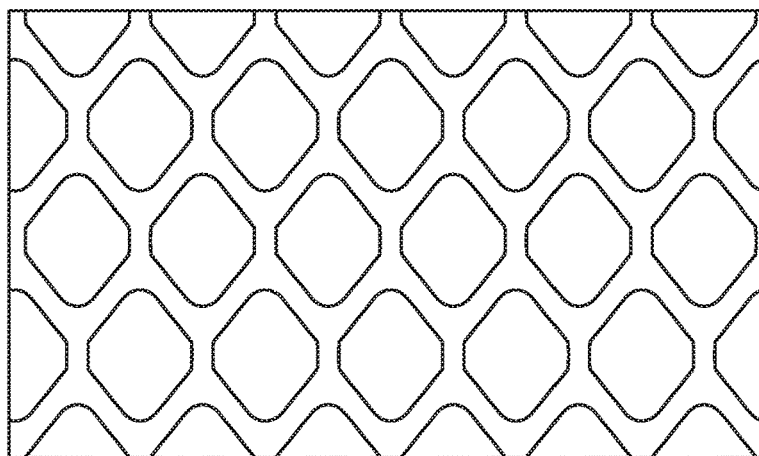
FIG. 6 illustrates still another pattern for applying a binder to a basesheet.
Figure 7:
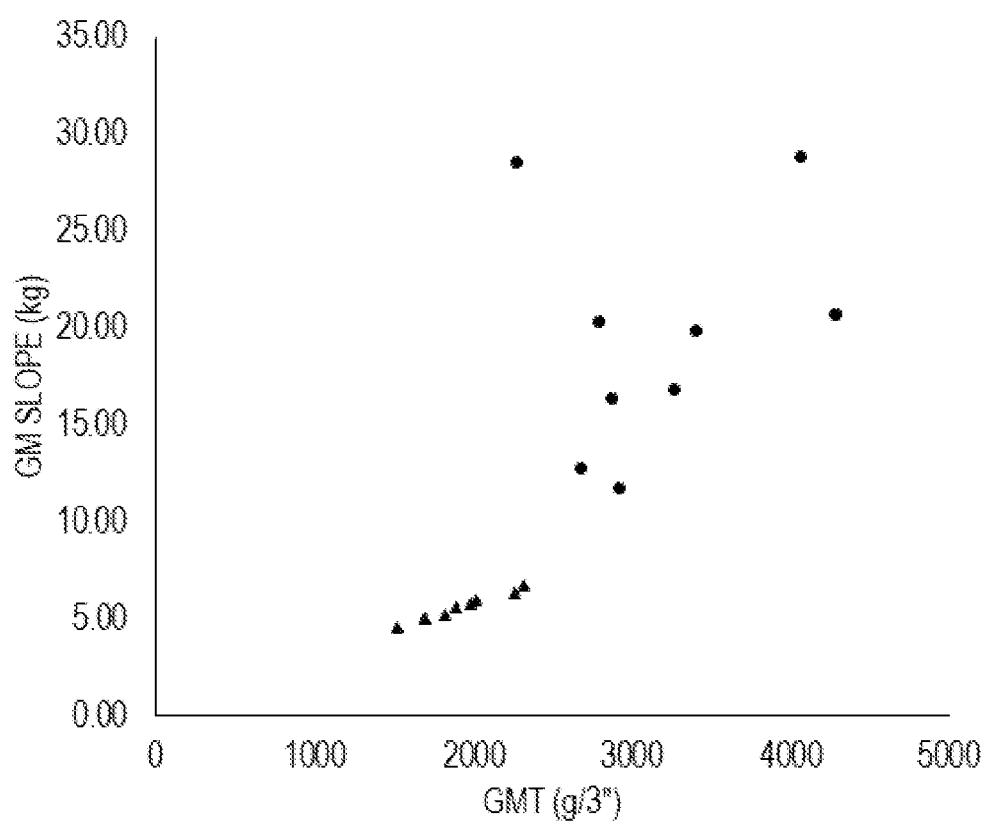
FIG. 7 is a graph of geometric mean tensile strength (GMT, g/3") versus geometric mean slope (GM Slope, kg) for commercial towel products (●) and inventive towel products (▲)
Figure 8:
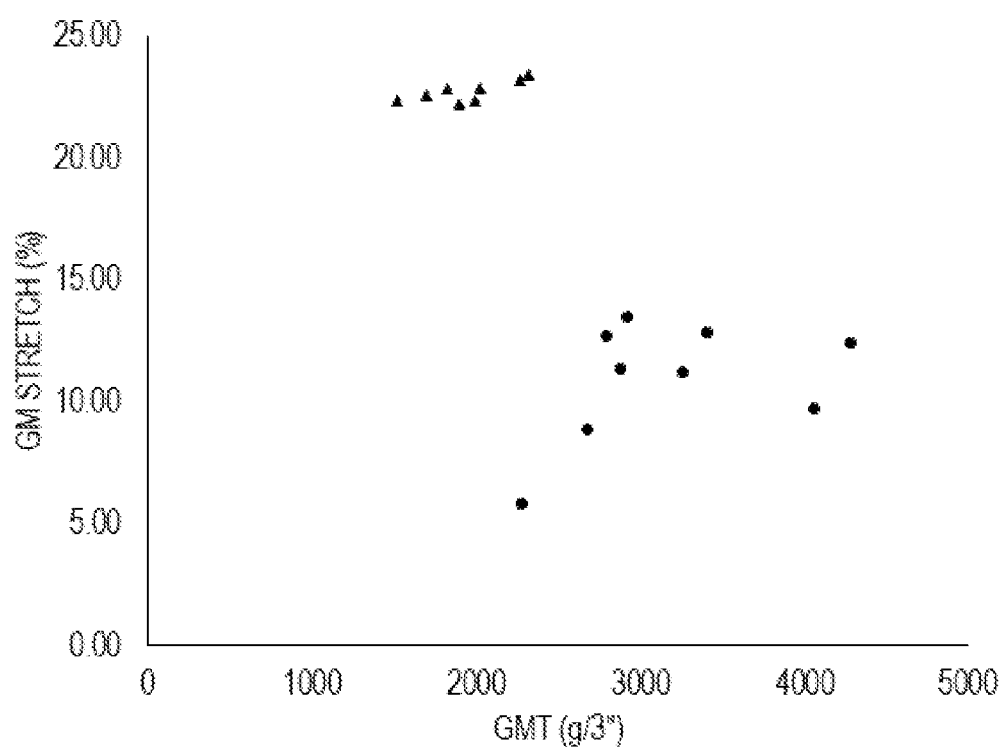
FIG. 8 is a graph of geometric mean tensile strength (GMT, g/3") versus geometric mean stretch (GM Stretch, %) for commercial towel products (●) and inventive towel products (▲)
Figure 9:
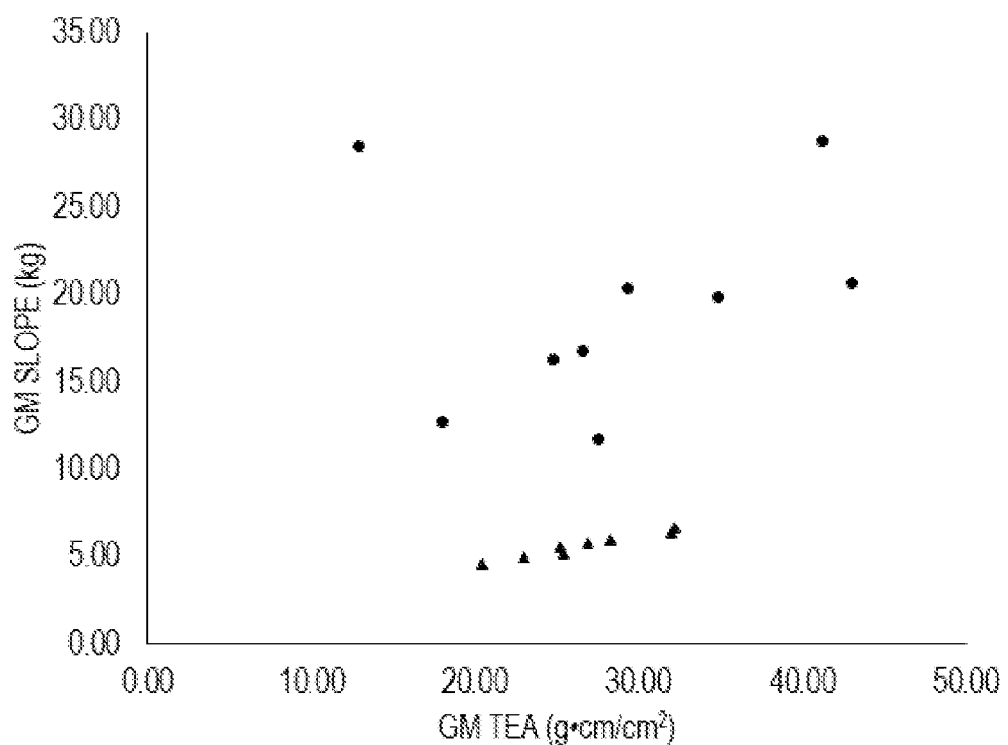
FIG. 9 is a graph of geometric mean tensile energy absorption (GM TEA, g·cm/cm$^2$) versus geometric mean slope (GM Slope, kg) for commercial towel products (●) and inventive towel products (▲)
Figure 10:
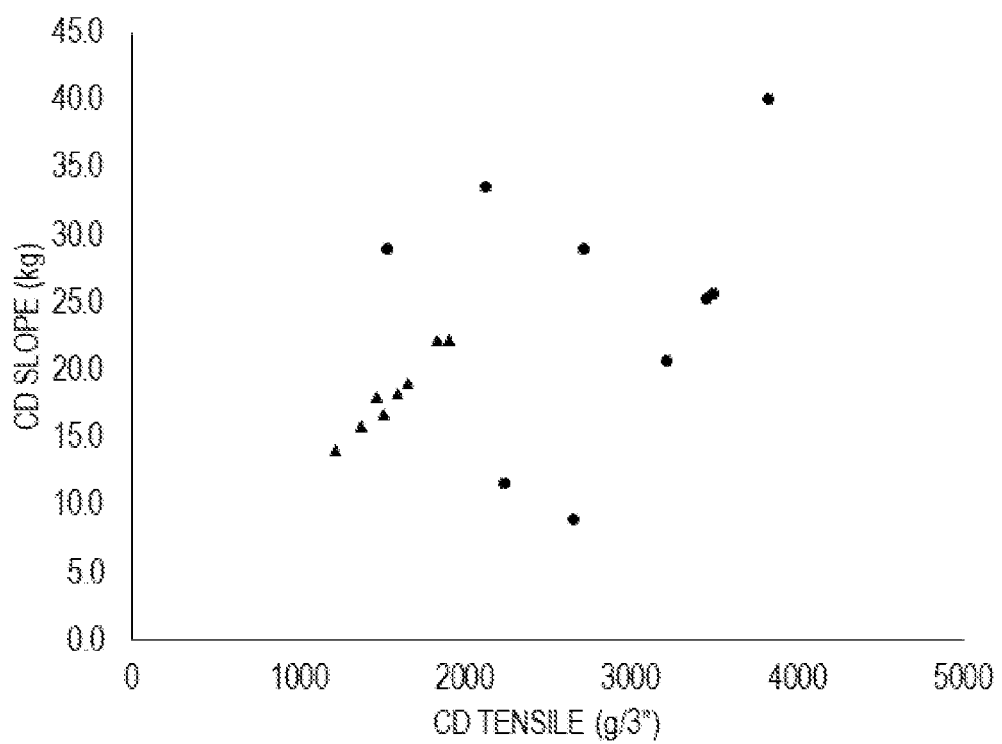
FIG. 10 is a graph of cross-machine direction tensile strength (CD Tensile, g/3") versus cross-machine direction slope (CD Slope, kg) for commercial towel products (●) and inventive towel products (▲).

FIGS. 4-6 illustrate several different print patterns that may be used for applying a binder material to a basesheet in accordance with this invention. As illustrated in FIG. 4, the pattern may comprise a succession of discrete dots. In one embodiment, for instance, the dots can be spaced so that there are approximately from about 25 to about 35 dots per inch (25.4 mm) in the machine direction and/or the cross-machine direction. The dots can have a diameter, for example, of from about 0.01 inch (0.25 mm) to about 0.03 inch (0.76 mm). In one particular embodiment, the dots can have a diameter of about 0.02 inch (0.51 mm) and can be present in the pattern so that approximately 28 dots per inch (25.4 mm) extend in both the machine direction and the cross-machine direction. Besides dots, various other discrete shapes such as elongated ovals or rectangles can also be used when printing the binder material onto the sheet.

One binder pattern is illustrated in FIG. 5, which illustrates a pattern made up of discrete multiple deposits that are each comprised of three elongated hexagons. In one embodiment, each hexagon can be about 0.02 inch (0.51 mm) long and can have a width of about 0.006 inch (0.15 mm). Approximately 35 to 40 deposits per inch (25.4 mm) can be spaced in the machine direction and the cross-machine direction.

Another binder pattern is illustrated in FIG. 6, in which the binder material is printed onto the sheet in a reticulated pattern. The dimensions are similar to those of the dot pattern of FIG. 4. Reticulated patterns, which provide a continuous network of binder material, may result in relatively greater sheet strength than comparable patterns of discrete elements, such as the dot pattern of FIG. 4. It will be appreciated that many other patterns, in addition to those illustrated above, can also be used depending on the desired properties of the final product.

With reference again to FIG. 3, after the binder material 70 is applied, the sheet 52 is adhered to a heated creping cylinder 75 by a press roll 76. The sheet 52 is carried on the surface of the heated creping cylinder 75 for a distance and then removed therefrom by the action of a creping blade 78. The creping blade 78 performs a controlled pattern creping operation on the side of the sheet 52 to which the binder material 70 was applied.

Once creped, the sheet 52 is pulled through an optional drying station 80. The drying station can include any form of a heating unit, such as an oven energized by infrared heat, microwave energy, hot air, or the like. Alternatively, the drying station may comprise other drying methods such as photo-curing, UV-curing, corona discharge treatment, electron beam curing, curing with reactive gas, curing with heated air such as through-air heating or impingement jet heating, infrared heating, contact heating, inductive heating, microwave or RF heating, and the like. Depending upon the binder material selected, however, drying station 80 may not be needed. Once passed through the drying station 80, the sheet 52 can be wound into a roll of material or product 85.

In certain instances, the binder composition may be selected not only to assist in creping the web but also for improving one or more physical properties of the web such as, for example, dry strength, wet strength, stretchability, and tear resistance. Particular binder compositions that may be used in the present invention include latex compositions. The latex composition may comprise a non-carboxylated latex emulsion or a carboxyl-functional latex emulsion polymer. Non-carboxylated latex emulsions useful in the present invention may comprise an aqueous polymer dispersion of vinyl acetate and ethylene. Suitable non-carboxylated latex emulsions include vinyl acetate and ethylene emulsions such as Vinnapas™ EZ123, commercially available from Wacker Polymers, LP (Allentown, PA). In other instances, the binder composition may comprise a carboxyl-functional latex polymer such as Vinnapas™ EP1133, commercially available from Wacker Polymers, LP (Allentown, PA).

Latex polymers useful in the present invention may comprise unsaturated monomers, such as vinyl acetate and ethylene monomers, polymerized in the presence of surfactants and initiators to produce emulsion-polymerized polymer particles. Unsaturated monomers contain carbon-to-carbon double bond unsaturation and generally include vinyl monomers, styrenic monomers, acrylic monomers, allylic monomers, acrylamide monomers, as well as carboxyl functional monomers. Vinyl monomers include vinyl esters such as vinyl acetate, vinyl propionate and similar vinyl lower alkyl esters, vinyl halides, vinyl aromatic hydrocarbons such as styrene and substituted styrenes, vinyl aliphatic monomers such as alpha olefins and conjugated dienes, and vinyl alkyl ethers such as methyl vinyl ether and similar vinyl lower alkyl ethers. Acrylic monomers include lower alkyl esters of acrylic or methacrylic acid having an alkyl ester chain from one to twelve carbon atoms as well as aromatic derivatives of acrylic and methacrylic acid. Useful acrylic monomers include, for instance, methyl, ethyl, butyl, and propyl acrylates and methacrylates, 2-ethyl hexyl acrylate and methacrylate, cyclohexyl, decyl, and isodecyl acrylates and methacrylates, and similar various acrylates and methacrylates.

In certain embodiments the latex polymers may comprise a carboxyl-functional latex polymer comprising copolymerized carboxyl-functional monomers such as acrylic and methacrylic acids, fumaric or maleic or similar unsaturated dicarboxylic acids, where the preferred carboxyl monomers are acrylic and methacrylic acid. In certain instances, the carboxyl-functional latex polymers may comprise by weight from about 1 to about 50 percent copolymerized carboxyl monomers with the balance being other copolymerized ethylene monomers. Suitable carboxyl-functional latex polymers include carboxylated vinyl acetate-ethylene polymer emulsions such as Vinnapas™ EP1133, commercially available from Wacker Polymers, LP (Allentown, PA).

In certain preferred embodiments the binder may comprise a carboxyl-functional latex emulsion polymer that has been reacted with an azetidinium-functional cross-linking polymer, such as a polyamide-epichlorohydrin (PAE) resins or a polyamide-polyamine-epichlorohydrin (PPE) resin. Crosslinked carboxyl-functional latex suitable for use as a binder in the manufacture of inventive tissue products are disclosed in U.S. Pat. No. 7,297,231, the contents of which are incorporated herein in a manner consistent with the present disclosure.

The binder composition may optionally contain an anti-blocking additive designed to modify the surface chemistry or characteristics of the binder film on the basesheet. Suitable anti-blocking additives generally do not react chemically with the binder and may include: 1) surfactants, including anionic surfactants such as sodium and potassium salts of stearic, palmitic, oleic, lauric, and tall oil fatty acids, and non-ionic surfactants such as polyoxyethylene glycols reacted to a lyophilic compound; 2) non-reactive additives, such as silicones, waxes, oils, designed to modify the surface chemistry of at least one outer surface of the web to reduce blocking; and 3) soluble or insoluble crystals, such as sugars, talc, clay, and the like, designed to reside on the surface of the binder film and thus reduce its propensity to cause blocking to an adjacent web surface. The amount of the anti-blocking additive in the binder composition, relative to the amount of carboxyl-functional latex emulsion polymer on a weight percent solids basis, can be from about 1 to about 25 percent, more specifically from about 5 to about 20 percent and more specifically from about 10 to about 15 percent.

In certain instances, the binder composition may be applied to the base web in a preselected pattern. In one embodiment, for instance, the binder composition can be applied to the web in a reticular pattern, such that the pattern is interconnected forming a net-like design or grid on the surface. In other embodiments the binder composition may be applied to the web in a pattern that represents a succession of discrete shapes. For example, the binder composition may be applied in a pattern of discrete dots. Despite consisting of discrete shapes, such patterns provide the desired physical properties without covering a substantial portion of the surface area of the web.

In certain preferred embodiments the binder composition is applied to only one side of the web so as to cover from about 15 to about 75 percent of the surface area of the web. More particularly, in most applications, the binder composition will cover from about 20 to about 60 percent of the surface area of the web. The total amount of binder composition applied to the web can be in the range of from about 1 to about 25 percent by weight, such as from about 2 to about 10 percent by weight, based upon the total weight of the web.

In the embodiment shown in FIG. 3 only one side of the web is treated with a binder composition leaving an untreated side. Leaving one side of the tissue web untreated may provide various benefits and advantages under some circumstances. For instance, the untreated side may increase the ability of the tissue web to absorb liquids faster. Further, the untreated side may have a greater texture than if the side were treated with a binder composition.

Further, the process illustrated in FIG. 3 represents only one possible method for applying a binder composition to the web. Other applications methods may be suitable for applying a binder composition to the web. For example, various printing methods can be used to print the binder composition onto the web depending upon the particular application. Such printing methods can include direct gravure printing, offset gravure printing, or flexographic printing.

In addition to having a binder composition applied to one or more outer surfaces, as described above, the tissue product may be subjected to additional converting, such as calendering, treatment with a softening composition, embossing, slitting, winding and/or folding.

In other instances, the basesheets prepared as described above may be subjected to plying to produce the inventive tissue products. For example, the tissue products of the present invention may be provided as multi-ply products comprising two or more plies, such as two, three or four plies, where the plies are mechanically joined together by crimping or the like. When plying multiple plies together the individual plies may be brought into facing arrangement with one another such that the ply outer surface brought into contact with the Yankee dryer and having a creping composition disposed thereon may face one another such that the surface contacted by the user in-use is substantially free from the creping composition.

In one embodiment the two or more basesheets are joined together by plying and embossing to form a two-ply, embossed, adhesively laminated, tissue product. In one embodiment the embossment pattern is applied only to the first ply, and therefore, each of the two plies serve different objectives and are visually distinguishable. For instance, the embossment pattern on the first ply provides, among other things, improved aesthetics regarding thickness and quilted appearance, while the second ply, being unembossed, is devised to enhance functional qualities such as absorbency, thickness and strength. In another embodiment the fibrous structure product is a two-ply product wherein both plies comprise a plurality of embossments. Suitable means of embossing include, for example, those disclosed in U.S. Pat. Nos. 5,096,527, 5,667,619, 6,032,712 and 6,755,928.

In a particularly preferred embodiment, the tissue product of the present invention is a two-ply tissue product comprising a first and a second ply, where the first ply bears a plurality of embossments and the second has not been heavily embossed and generally does not have a distinct embossment pattern disposed thereon. In this manner the first tissue ply is embossed whereas the second ply is unembossed. The degree to which the first tissue ply is embossed can be achieved in several ways. For example, the embossing apparatus may comprise an impression roll made of materials having different degrees of softness to allow a higher penetration depth of the first and second protuberances. Alternatively, the pressure at the nip between the engraved embossing roll and the impression roll may be varied.

In addition to embossing, the individual plies may be joined together using well known techniques such as with a laminating adhesive to hold the plies together. In particularly preferred instances the plies may be combined using an embossing-lamination assembly that uses both mechanical and adhesive means to join the plies. For example, the plies may be embossed and joined together using at least one steel embossing roller, at least one rubber-coated embossing counter-roller, and at least one roller for distribution of an adhesive, which may be applied to the tissue web after it exits the pair of embossing rollers.

After plying, the tissue product may be further converted by slitting, perforating, cutting and/or winding. For example, the tissue product may be in roll form where sheets of the embossed tissue product are convolutedly wrapped about themselves, with or without the use of a core with perforations extending in the cross-machine direction and separating the product into individual sheets.

Test Methods

Basis Weight

Basis weight of a sample is measured by selecting twelve (12) products (also referred to as sheets) of the sample and making two (2) stacks of six (6) sheets. In the event the sample consists of perforated sheets of bath or towel tissue, the perforations must be aligned on the same side when stacking the usable units. A precision cutter is used to cut each stack into exactly 10.16×10.16 cm (4.0×4.0 inch) squares. The two stacks of cut squares are combined to make a basis weight pad of twelve (12) squares thick. The pad of twelve (12) squares is placed in an oven preheated to 105±2° C. The pad remains in the oven for at least thirty (30) minutes, after which tine it is removed and weighed on a top loading balance with a minimum resolution of 0.01 grams. The top loading balance must be protected from air drafts and other disturbances using a draft shield. Weights are recorded when the readings on the top loading balance become constant. The mass of the sample (grams) per unit area (square meters) is calculated and reported as the basis weight, having units of grams per square meter (gsm).

Caliper

Caliper is measured in accordance with TAPPI test methods Test Method T 580 μm-12 "Thickness (caliper) of towel, tissue, napkin and facial products." The micrometer used for carrying out caliper measurements is an Emveco 200-A Tissue Caliper Tester (Emveco, Inc., Newberg, OR). The micrometer has a load of 2 kilopascals, a pressure foot area of 2,500 square millimeters, a pressure foot diameter of 56.42 millimeters, a dwell time of 3 seconds and a lowering rate of 0.8 millimeters per second. Caliper may be measured by selecting ten (10) products (also referred to as sheets) of the sample and making a stack. In the event the sample consists of perforated sheets of bath or towel tissue, the perforations must be aligned on the same side when stacking the usable units. The thickness of the stack is measured using the micrometer and the stack thickness is divided by 10 to achieve the caliper of the product.

Tensile

Tensile testing is conducted on a tensile testing machine maintaining a constant rate of elongation and the width of each specimen tested is 3 inches. Testing is conducted under TAPPI conditions. Prior to testing, samples are conditioned under TAPPI conditions (23±1° C. and 50±2 percent relative humidity) for at least 4 hours and then cutting a 3±0.05 inch (76.2±1.3 mm) wide strip in either the machine direction (MD) or cross-machine direction (CD) orientation using a JDC Precision Sample Cutter (Thwing-Albert Instrument Company, Philadelphia, PA, Model No. JDC 3-10, Serial No. 37333) or equivalent. The instrument used for measuring tensile strengths was an MTS Systems Sintech 11S, Serial No. 6233. The data acquisition software was MTS TestWorks® for Windows Ver. 3.10 (MTS Systems Corp., Research Triangle Park, NC). The load cell was selected from either a 50 Newton or 100 Newton maximum, depending on the strength of the sample being tested, such that the majority of peak load values fall between 10 to 90 percent of the load cell's full-scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the "MD tensile strength" or the "CD tensile strength" of the specimen depending on direction of the sample being tested. Ten representative specimens were tested for each product or sheet and the arithmetic average of all individual specimen tests was recorded as the appropriate MD or CD tensile strength having units of grams per three inches (g/3"). Tensile energy absorbed (TEA) and slope are also calculated by the tensile tester. TEA is reported in units of g·cm/cm$^2$ and slope is recorded in units of kilograms (kg). Both TEA and Slope are directionally dependent and thus MD and CD directions are measured independently.

All products were tested in their product forms without separating into individual plies. For example, a 2-ply product was tested as two plies and recorded as such. In the tensile properties of basesheets were measured, the number of plies used varied depending on the intended end use. For example, if the basesheet was intended to be used for 2-ply product, two plies of basesheet were combined and tested.

Wet CD Tensile

Wet tensile strength measured in the same manner as described for dry tensile above, except the center portion of the previously conditioned sample strip is saturated with distilled water immediately prior to loading the specimen into the tensile test equipment. Sample wetting is performed by first laying a single test strip onto a piece of blotter paper (Fiber Mark, Reliance Basis 120). A pad is then used to wet the sample strip prior to testing. The pad is a green, Scotch-Brite brand (3M) general purpose commercial scrubbing pad. To prepare the pad for testing, a full-size pad is cut approximately 2.5 inches long by 4 inches wide. A piece of masking tape is wrapped around one of the 4 inch long edges. The taped side then becomes the "top" edge of the wetting pad. To wet a tensile strip, the tester holds the top edge of the pad and dips the bottom edge in approximately 0.25 inches of distilled water located in a wetting pan. After the end of the pad has been saturated with water, the pad is then taken from the wetting pan and the excess water is removed from the pad by lightly tapping the wet edge three times across a wire mesh screen. The wet edge of the pad is then gently placed across the sample, parallel to the width of the sample, in the approximate center of the sample strip. The pad is held in place for approximately one second and then removed and placed back into the wetting pan. The wet sample is then immediately inserted into the tensile grips, so the wetted area is approximately centered between the upper and lower grips. The test strip should be centered both horizontally and vertically between the grips. (It should be noted that if any of the wetted portion comes into contact with the grip faces, the specimen must be discarded, and the jaws dried off before resuming testing.) The tensile test is then performed, and the peak load recorded as the wet CD tensile strength of this specimen. As with the dry CD tensile test, the characterization of a product is determined by the average of ten representative sample measurements.

EXAMPLE

A pilot tissue machine was used to produce a layered, uncreped through-air dried ("UCTAD") towel basesheet in accordance with this invention generally as described in FIG. 1. After manufacture on the tissue machine, the UCTAD basesheet was printed on one side with a latex-based binder substantially as illustrated in FIG. 2. The binder-treated sheet was adhered to the surface of a Yankee dryer to re-dry the sheet and thereafter the sheet was creped and wound onto a roll without any additional thermal curing. The resulting sheet was converted into rolls of 2-ply towels using an embossing-lamination assembly that uses both mechanical and adhesive means to join the plies.

More specifically, the basesheet was made from a stratified fiber furnish containing a center layer of fibers (40 percent by weight of the web) positioned between two outer layers of fibers (each outer layer comprising 30 percent by weight of the web). The fiber furnish consisted of Northern softwood kraft (NSWK), Southern softwood kraft (SSWK) and *Eucalyptus* hardwood kraft (EHWK). The first outer layer contacted the through-air drying fabric during manufacture (fabric layer) and the second outer layer (air layer) was treated with binder and contacted the Yankee dryer. The furnish composition of each layer is summarized in Table 2, below. The weight percentages in Table 2 reflect the weight percentage of a given fibrous layer. Strength agents (Kymene 920A from Solenis, Wilmington, DE) and carboxymethyl cellulose (CMC), were added to all layers in equal portions with the total add-on reflected in Table 2 on a kilogram of strength agent per metric ton of fiber furnish basis. A chemical debonder (ProSoft TQ1003, commercially available from Solenis, Wilmington, DE) having a solids of approximately 4 percent was selectively incorporated into specific layers as set forth in Table 2.

TABLE 2

| Inventive Sample | 1 | 2 | 3 | 4 | 5 | 6 | 7 |
|---|---|---|---|---|---|---|---|
| Rush Transfer | 28% | 28% | 28% | 28% | 28% | 15% | 22% |
| Layer Split | 30/40/30 | 30/40/30 | 30/40/30 | 30/40/30 | 30/40/30 | 30/40/30 | 20/60/20 |
| Outer Layer (Fabric Side) | 100% NSWK | 100% NSWK | 100% SSWK | 100% SSWK | 100% NSWK | 100% NSWK | 100% EHWK |
| Center Layer | 100% SSWK | 100% SSWK | 100% SSWK | 100% SSWK | 72% NSWK 28% SSWK | 72% NSWK 28% SSWK | 100% NSWK |
| Outer Layer (Air Side) | 100% NSWK | 100% NSWK | 100% NSWK | 100% NSWK | 72% NSWK 28% SSWK | 72% NSWK 28% SSWK | 100% EHWK |
| Kymene (kg/MT) | 3 | 3 | 3 | 3 | 3 | 3 | 9 |
| CMC (kg/MT) | 1 | 1 | 1 | 1 | 1 | 1 | 3 |
| Debonder (kg/MT) | 6 Center Layer only | 5 Center Layer only | 5 Center and Fabric Layers | 6 Center and Fabric Layers | 6 Center and Air Layers | 6 Center and Air Layers | None |

The machine-chest furnish containing the chemical additives was diluted to approximately 0.2 percent consistency and delivered to a layered headbox. The basesheet was then rush transferred to a transfer fabric traveling 15 to 28 percent slower than the forming fabric using a vacuum roll to assist the transfer. At a second vacuum-assisted transfer, the basesheet was transferred and wet-molded onto the through-air drying fabric (TMEX, commercially available from Voith Fabrics, Appleton, WI). The sheet was dried with a through-air dryer resulting in a basesheet.

The resulting basesheet was fed to a gravure printing line, traveling at about 1,500 feet per minute where a latex binder was printed onto the second outer layer (air layer) of the sheet. The printed side of the sheet was then pressed against and doctored off a rotating drum, which had a surface temperature of approximately 132° C. Finally, the sheet was wound onto a roll without any additional thermal curing.

The binder composition resulted from the cross-linking reaction of a carboxylated vinyl acetate-ethylene terpolymer, an azetidinium-functional cross-linking polymer and a chemically reactive multi-functional aldehyde anti-blocking additive. The carboxylated vinyl acetate-ethylene terpolymer is commercially available from Wacker Polymers, LP (Allentown, PA) under the tradename Vinnapas™ EP-1133. The azetidinium-functional crosslinking polymer is commercially available from Solenis (Wilmington, DE) under the tradename Kymene 920A. The multi-functional aldehyde anti-blocking additive is commercially available from Kemira (Atlanta, GA) under the tradename Fennobond 3000. The add-on amount of the binder applied to the sheet was approximately 7 weight percent.

The print creped tissue web was subjected to further converting to produce a two-ply tissue product by embossing and laminating. The embossed and laminated 2-ply web was then converted into a rolled towel product and subjected to physical testing, the results of which are shown in Tables 3-5, below.

TABLE 3

| Inventive Sample | Basis Weight (gsm) | Caliper (μm) | Bulk (cc/g) | GMT (g/3") | MD:CD Tensile Ratio |
|---|---|---|---|---|---|
| 1 | 58.45 | 826 | 14.12 | 1989 | 1.55 |
| 2 | 58.23 | 775 | 13.30 | 2317 | 1.47 |
| 3 | 58.34 | 846 | 14.50 | 1827 | 1.54 |
| 4 | 58.56 | 836 | 14.27 | 2265 | 1.52 |
| 5 | 59.85 | 904 | 15.11 | 1518 | 1.54 |
| 6 | 60.28 | 871 | 14.45 | 1897 | 1.57 |
| 7 | 59.42 | 876 | 14.75 | 1697 | 1.50 |
| 8 | 58.56 | 851 | 14.53 | 2024 | 1.47 |

TABLE 4

| Inventive Sample | CD Tensile (g/3") | CD Stretch (%) | CD Slope (kg) | CD TEA (g · cm/cm$^2$) | CD Wet Tensile (g/3") |
|---|---|---|---|---|---|
| 1 | 1601 | 16.1 | 8.45 | 18.3 | 634 |
| 2 | 1911 | 17.5 | 9.42 | 22.2 | 797 |
| 3 | 1471 | 17.3 | 7.30 | 18.0 | 596 |
| 4 | 1836 | 17.4 | 8.71 | 22.3 | 808 |
| 5 | 1222 | 16.6 | 5.97 | 14.1 | 504 |
| 6 | 1513 | 16.5 | 7.11 | 16.8 | 670 |
| 7 | 1384 | 16.4 | 7.03 | 15.8 | 565 |
| 8 | 1666 | 16.8 | 7.96 | 19.1 | 725 |

TABLE 5

| Inventive Sample | GM Slope (kg) | Stiffness Index | GM TEA (g · cm/cm$^2$) | GM Stretch (%) | Wet/Dry Ratio |
|---|---|---|---|---|---|
| 1 | 5.771 | 2.90 | 27.0 | 22.4 | 0.40 |
| 2 | 6.705 | 2.89 | 32.2 | 23.4 | 0.42 |
| 3 | 5.220 | 2.86 | 25.4 | 22.9 | 0.40 |
| 4 | 6.371 | 2.81 | 32.0 | 23.2 | 0.44 |
| 5 | 4.569 | 3.01 | 20.5 | 22.4 | 0.41 |
| 6 | 5.591 | 2.95 | 25.2 | 22.2 | 0.44 |
| 7 | 5.049 | 2.98 | 23.0 | 22.5 | 0.41 |
| 8 | 5.972 | 2.95 | 28.2 | 22.9 | 0.43 |

EMBODIMENTS

First embodiment: A multi-ply tissue product comprising a first creped tissue ply and a second creped tissue ply, the product having a geometric mean tensile strength (GMT) less than about 2,500 g/3", such as from about 1,500 to about 2,500 g/3", and geometric mean slope (GM Slope) less than about 10.0 kg, such as from about 4.0 to about 10.0 kg.

Second embodiment: The product of the first embodiment having a Stiffness Index less than about 5.00, such as from about 2.00 to about 5.00.

Third embodiment: The product of embodiments 1 or 2 wherein each of the first and the second creped tissue plies has a first outer surface and a latex polymer disposed thereon. In a particularly preferred embodiment, the latex polymer is crosslinked.

Fourth embodiment: The product of any one of embodiments 1 through 3 wherein each of the first and the second creped tissue plies has a first outer surface and a creping composition consisting essentially of a crosslinked vinyl acetate-ethylene polymer and optionally an anti-blocking agent is disposed on the first outer surface. In certain embodiments the anti-blocking agent may comprise a polysaccharide or a surfactant.

Fifth embodiment: The product of any one of embodiments 1 through 4 having a cross-machine direction slope (CD Slope) less than about 25.0 kg, such as from about 10.0 to about 25.0 kg.

Sixth embodiment: The product of any one of embodiments 1 through 5 having cross-machine direction tensile energy absorption (CD TEA) greater than about 15.0 g·cm/cm$^2$, such as from about 15.0 to about 24.0 g·cm/cm$^2$.

Seventh embodiment: The product of any one of embodiments 1 through 6 having a geometric mean tensile energy absorption (GM TEA) from about 20 to about 32 g·cm/cm$^2$.

Eighth embodiment: The product of any one of embodiments 1 through 7 having a geometric mean stretch (GM Stretch) greater than about 15 percent, such as from about 20 to about 25 percent.

Ninth embodiment: The product of any one of embodiments 1 through 8 having a TEA Index of about 1.00 or greater, such as about 1.20 or greater, such as from about 1.00 to about 1.50.

Tenth embodiment: The product of any one of embodiments 1 through 9 wherein each of the first and the second creped tissue plies has a first outer surface and a creping composition disposed thereon and wherein the first and second creped tissue plies are plied together in facing arrangement such that the first outer surfaces face one another and the outer surfaces of the product are substantially free from the creping composition.

Eleventh embodiment: The product of any one of embodiments 1 through 10 having cross-machine direction stretch (CD Stretch) of at least about 12.0 percent, such as from about 12.0 to about 18.0 percent.

Twelfth embodiment: The product of any one of embodiments 1 through 11 having a cross-machine direction tensile (CD Tensile) from about 1,200 to about 2,000 g/3".

Thirteenth embodiment: The product of any one of embodiments 1 through 12 having a Wet/Dry Ratio greater than about 0.40.

Fourteenth embodiment: The product of any one of embodiments 1 through 13 having a basis weight from about 50 to about 60 grams per square meter (gsm) and a bulk greater than about 12.0 cubic centimeters per gram (cc/g).

Fifteenth embodiment: The product of any one of embodiments 1 through 14 wherein the first and second tissue plies are through-air dried.

Sixteenth embodiment: The product of any one of embodiments 1 through 15 further comprising a plurality of embossments disposed on either the first or second tissue plies.

What is claimed is:

1. A multi-ply tissue product comprising a first creped tissue ply and a second creped tissue ply, the multi-ply tissue product having a basis weight from about 45 to about 65 grams per square meter (qsm), a geometric mean tensile strength (GMT) from about 1,500 to about 2,500 g/3", a geometric mean slope (GM Slope) from about 4.0 to about 10.0 kg and a bulk greater than about 12.0 cc/g.

2. The multi-ply tissue product of claim 1 having a Stiffness Index less than about 5.00.

3. The multi-ply tissue product of claim 1 wherein each of the first and the second creped tissue plies has a first outer surface and a latex polymer disposed thereon.

4. The product of claim 1 wherein each of the first and the second creped tissue plies has a first outer surface and a creping composition consisting essentially of a crosslinked vinyl acetate-ethylene polymer and optionally an anti-blocking agent is disposed on the first outer surface.

5. The product of claim 1 having a cross-machine direction slope (CD Slope) from about 10.0 to about 25.0 kg.

6. The product of claim 1 having a cross-machine direction tensile energy absorption (CD TEA) from about 15.0 to about 24.0 g·cm/cm2.

7. The product of claim 1 having a geometric mean tensile energy absorption (GM TEA) from about 20 to about 32 g·cm/cm2.

8. The product of claim 1 having a geometric mean stretch (GM Stretch) greater than about 15 percent.

9. The product of claim 1 having a TEA Index of about 1.00 or greater.

10. The product of claim 1 wherein each of the first and the second creped tissue plies has a first outer surface and a creping composition disposed thereon and wherein the first and second creped tissue plies are plied together in facing arrangement such that the first outer surfaces face one another and the outer surfaces of the product are substantially free from the creping composition.

11. The product of claim 1 having a CD Stretch greater than about 12.0 percent.

12. The product of claim 1 having a Wet/Dry Ratio greater than about 0.40.

13. The product of claim 1 having a basis weight from about 50 to about 60 grams per square meter (gsm) and a bulk greater than about 14.0 cubic centimeters per gram (cc/g).

14. The product of claim 1 having a cross-machine direction tensile (CD Tensile) from about 1,200 to about 2,000 g/3".

15. The product of claim 1 wherein the first and second tissue plies are through-air dried.

* * * * *